(12) United States Patent
Sattler et al.

(10) Patent No.: US 8,375,787 B2
(45) Date of Patent: Feb. 19, 2013

(54) ROTATION RATE SENSOR AND METHOD FOR OPERATING A ROTATION RATE SENSOR

(75) Inventors: Robert Sattler, Leonberg (DE); Daniel Christoph Meisel, Vaihingen An Der Enz (DE); Joerg Hauer, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 455 days.

(21) Appl. No.: 12/637,171

(22) Filed: Dec. 14, 2009

(65) Prior Publication Data

US 2010/0186505 A1 Jul. 29, 2010

(30) Foreign Application Priority Data

Dec. 16, 2008 (DE) .......................... 10 2008 054 749

(51) Int. Cl.
 *G01C 19/56* (2012.01)
(52) U.S. Cl. ..................................... 73/504.12
(58) Field of Classification Search ................ 73/504.12
 See application file for complete search history.

(56) References Cited

U.S. PATENT DOCUMENTS

| 2003/0154788 A1* | 8/2003 | Willig et al. | 73/504.02 |
| 2004/0206176 A1* | 10/2004 | Willig et al. | 73/504.12 |

FOREIGN PATENT DOCUMENTS

| DE | 101 08 197 | 9/2002 |
| DE | 101 08 196 | 10/2002 |
| DE | 102 37 410 | 8/2003 |

\* cited by examiner

*Primary Examiner* — Hezron E Williams
*Assistant Examiner* — Gregory J Redmann
(74) *Attorney, Agent, or Firm* — Kenyon & Kenyon LLP

(57) ABSTRACT

A rotation rate sensor includes a substrate having a main extension plane, and a Coriolis element movable relative to the substrate, the Coriolis element being provided to be excitable to perform an oscillation deflection substantially parallel to the main extension plane; and the Coriolis element further being provided to be deflectable, by way of a Coriolis force acting on the Coriolis element, to perform a detectable Coriolis deflection perpendicular to the main extension plane; and the rotation rate sensor further including at least one compensation electrode that is provided for at least partial compensation, as a function of the oscillation deflection, for a levitation force acting on the Coriolis element.

11 Claims, 4 Drawing Sheets

ROTATION RATE SENSOR AND METHOD FOR OPERATING A ROTATION RATE SENSOR

BACKGROUND INFORMATION

German Patent Nos. DE 101 08 196, DE 101 08 197, and DE 102 37 410, for example, describe rotation rate sensors having Coriolis elements in which, in particular, a first and a second Coriolis element are interconnected via a spring and excited to oscillate parallel to a first axis (X); a first and a second detection means detect a deflection of the first and the second Coriolis element on the basis of a Coriolis force acting on the Coriolis elements perpendicular to the third axis (Y), so that the difference between a first detected signal of the first detection means and a second detected signal of the second detection means is dependent on the Coriolis force and thus also dependent on the rotation rate of the rotation sensor; and the rotation axis is parallel to the surface normal line of a main extension plane of the rotation rate sensor. It is likewise commonly known to use rotation rate sensors of this kind for the detection of rotation rates having a rotation axis in the main extension plane of the rotation rate sensor, for example parallel to the third axis (Y), the first and the second oscillation oscillating parallel to a first axis (X) and antiparallel to one another, and the deflections of the first and the second Coriolis element occurring parallel to a surface normal line of the main extension plane.

SUMMARY OF THE INVENTION

The rotation rate sensor according to the present invention, and the method according to the present invention for operating a rotation rate sensor, have, as compared with the existing art, the advantage that the levitation force acting on the Coriolis element is at least partly compensated for as a function of the deflection of the Coriolis element, and a levitation motion of the Coriolis element is thus at least partly suppressed. The result of this is that considerably greater measurement accuracy for the rotation rate sensor is achieved. The Coriolis element is excited to oscillate by a driving force acting in timed fashion on the Coriolis element, and as a result of the oscillation is periodically deflected, by an amount equal to one oscillation deflection, out of a rest position parallel to the main extension plane; the driving force proceeds from the excitation means. The driving force does not necessarily, however, have only a force component parallel to the main extension plane, but also exhibits an undesired applied force perpendicular to the main extension plane. This undesired applied force, hereinafter also referred to as "levitation force," results in a levitation motion of the Coriolis element perpendicular to the main extension plane, which is superimposed on the Coriolis deflection that is to be measured and which thus reduces the measurement accuracy.

The intensity of the levitation force depends on the oscillation deflection of the Coriolis element out of the rest position, so that in order to achieve a comparatively high measurement accuracy for the rotation rate sensor according to the present invention, the levitation force is also compensated for as a function of the oscillation deflection. The compensation force preferably encompasses an electrostatic applied force between the first Coriolis element and the compensation electrode. Particularly preferably, the rotation rate sensor is provided for the detection of rotation rates parallel to the first axis, parallel to the second axis, and/or parallel to a third axis perpendicular to the first and/or to the second axis.

According to a preferred refinement, provision is made that the excitation means encompasses a drive electrode connected to the substrate, and a counterelectrode connected to the Coriolis element, the compensation electrode being disposed perpendicular to the main extension plane between the substrate and the counterelectrode. Particularly preferably, the counterelectrode thus acts simultaneously both as a counterelectrode for the drive electrode and as a counterelectrode for the compensation electrode. Particularly advantageously, an electrostatic compensating force is also generated between the compensation electrode and the counterelectrode, which force is directed substantially perpendicular to the main extension plane and thus counteracts the levitation force.

According to a further preferred refinement, provision is made that the compensation electrode is embodied in such a way that a coverage of the compensation electrode by the counterelectrode as a function of the oscillation deflection is provided. By preference, a compensation force dependent on the oscillation deflection is generated merely by the corresponding geometry of the counterelectrode, so that advantageously, no adaptation of the compensation force to the oscillation deflection (by correspondingly complex activation of the compensation electrode) is necessary. Particularly advantageously, the compensation electrode is disposed in such a way that with an increasing drive coverage between the drive electrode and the counterelectrode, an increasing coverage of the compensation electrode by the counterelectrode is also produced, so that the greater levitation force as a consequence of the greater drive coverage is correspondingly compensated for by a greater compensation force as a consequence of the automatically greater coverage. The compensation force is thus dependent, in simple fashion, on the oscillation deflection.

According to a further preferred refinement, provision is made that the compensation electrode is connected in electrically conductive fashion to the drive electrode so that, particularly advantageously, the compensation electrode is automatically also activated in phase as a result of the activation of the drive electrode, and no additional circuits or terminal leads are therefore needed in order to apply control to the compensation electrode.

According to a further preferred refinement, provision is made that the compensation electrode encompasses a first part and a second part, the coverage between the first part and the counterelectrode being provided in a manner dependent on the oscillation deflection, and a further coverage between the second part and the counterelectrode being provided independently of the oscillation deflection. In particularly advantageous fashion, a constant levitation force that is independent of the oscillation deflection is thus continuously compensated for by the second part of the compensation electrode, whereas the oscillation-dependent portion of the levitation force is compensated for in oscillation-dependent fashion by the first part of the compensation electrode. Comparatively precise compensation for the levitation force is thus advantageously possible in all phases of the oscillation.

According to a further preferred refinement, provision is made that a plurality of drive electrodes and a plurality of counterelectrodes be embodied as mutually interengaging comb structures, so that the drive means can advantageously be implemented as an electrostatic comb drive; in a first position, the drive electrodes and the counterelectrodes preferably overlap completely, whereas in a second position of the drive electrodes and the counterelectrodes, exactly no further overlap exists. Oscillation of the Coriolis element relative to the substrate occurs between the first and the second position, so that the respective position depends on the oscillation deflection. In the context of an oscillation deflection motion, the levitation force increases from the second position toward the first position; the levitation force advantageously increases in substantially linear fashion in such a configuration, so that a compensation for the changing compensation force can, on the other hand, also be compensated for by way of a substantially linearly increasing compensation force.

According to a further preferred refinement, provision is made that the coverage is provided between the one compensation electrode and a plurality of counterelectrodes, so that, advantageously, on the one hand only one compensation electrode needs to be adapted for compensating for the sum of all levitation forces, and on the other hand compensation for the levitation forces is possible even when, for example because of technical barriers in the manufacturing process, a single compensation electrode cannot be dimensioned to be small enough to achieve the desired compensation result.

According to a further preferred refinement, provision is made that a plurality of compensation electrodes that by preference are embodied as comb electrodes are, at least in part, disposed in the region of the plurality of counterelectrodes, so that exactly one compensation electrode is associated with each counterelectrode. The drive means and the associated compensation means are thus, particularly advantageously, arbitrarily scalable.

According to a further preferred refinement, provision is made that the width of the comb electrodes is provided in a manner embodied as a function of the desired compensation force, the width of, in particular, the first part being adjusted correspondingly. The compensation force is generated as a result of the electrostatic interaction between the counterelectrode and the compensation electrode, the electrostatic interaction depending on the electrical capacitance between the counterelectrode and the compensation electrode. The strength of the compensation force can therefore easily be adjusted by varying the area of the compensation electrode.

A further subject of the present invention is a method for operating a rotation rate sensor, the levitation force acting on the Coriolis element being compensated for at least in part by way of the compensation electrode as a function of the oscillation deflection. As already set forth above in detail, the levitation forces acting on the Coriolis element are dependent on the oscillation deflection of the Coriolis element relative to the substrate, so that comparatively precise compensation for the levitation force is achievable by way of a compensation force that is dependent on the oscillation deflection, and the measurement accuracy of the rotation rate sensor is thus greatly enhanced as compared with the existing art.

DETAILED DESCRIPTION

Figure 1A:
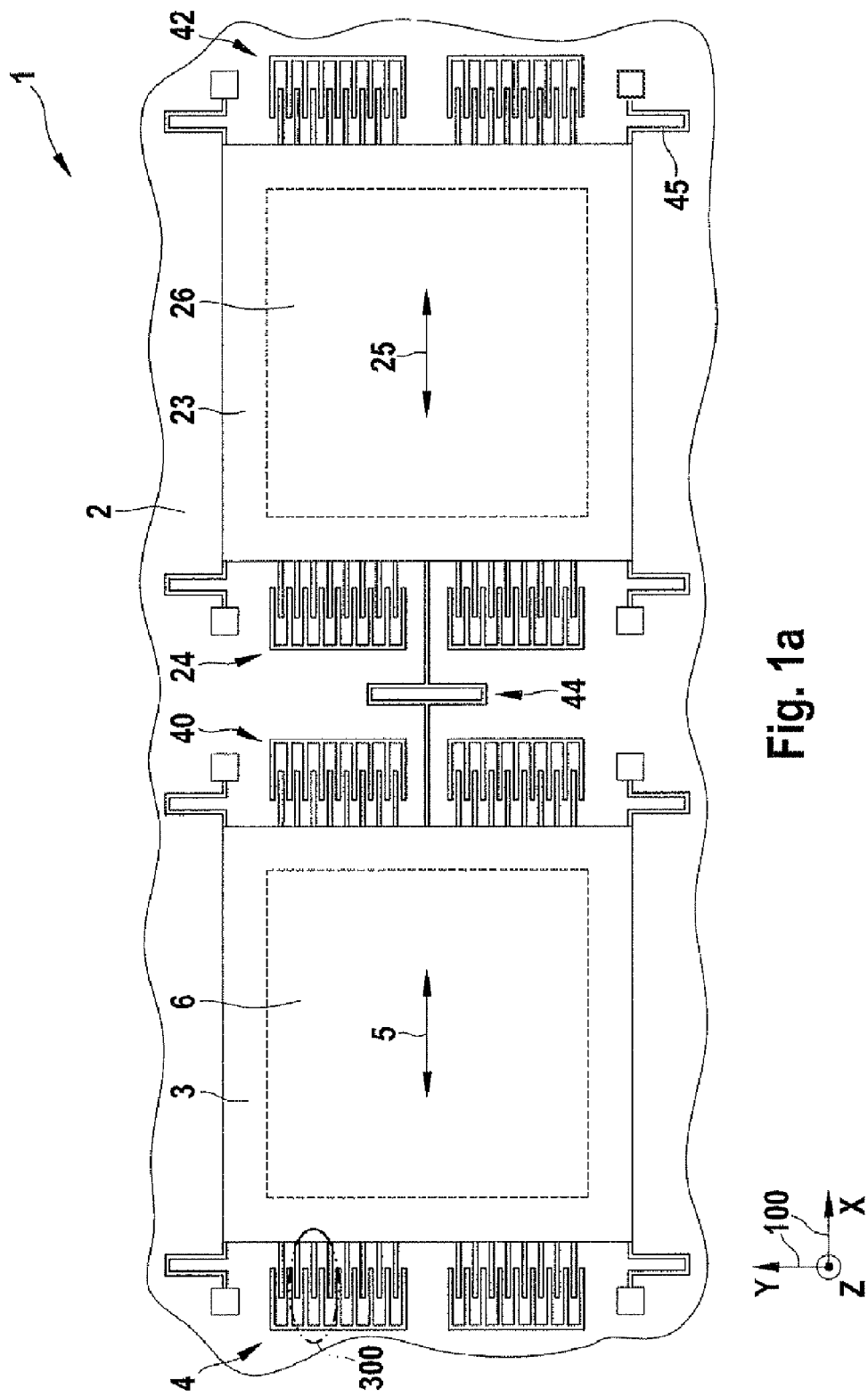
FIGS. 1*a* and 1*b* show a schematic plan view and a schematic side view of a rotation rate sensor according to the existing art.
Figure 1B:
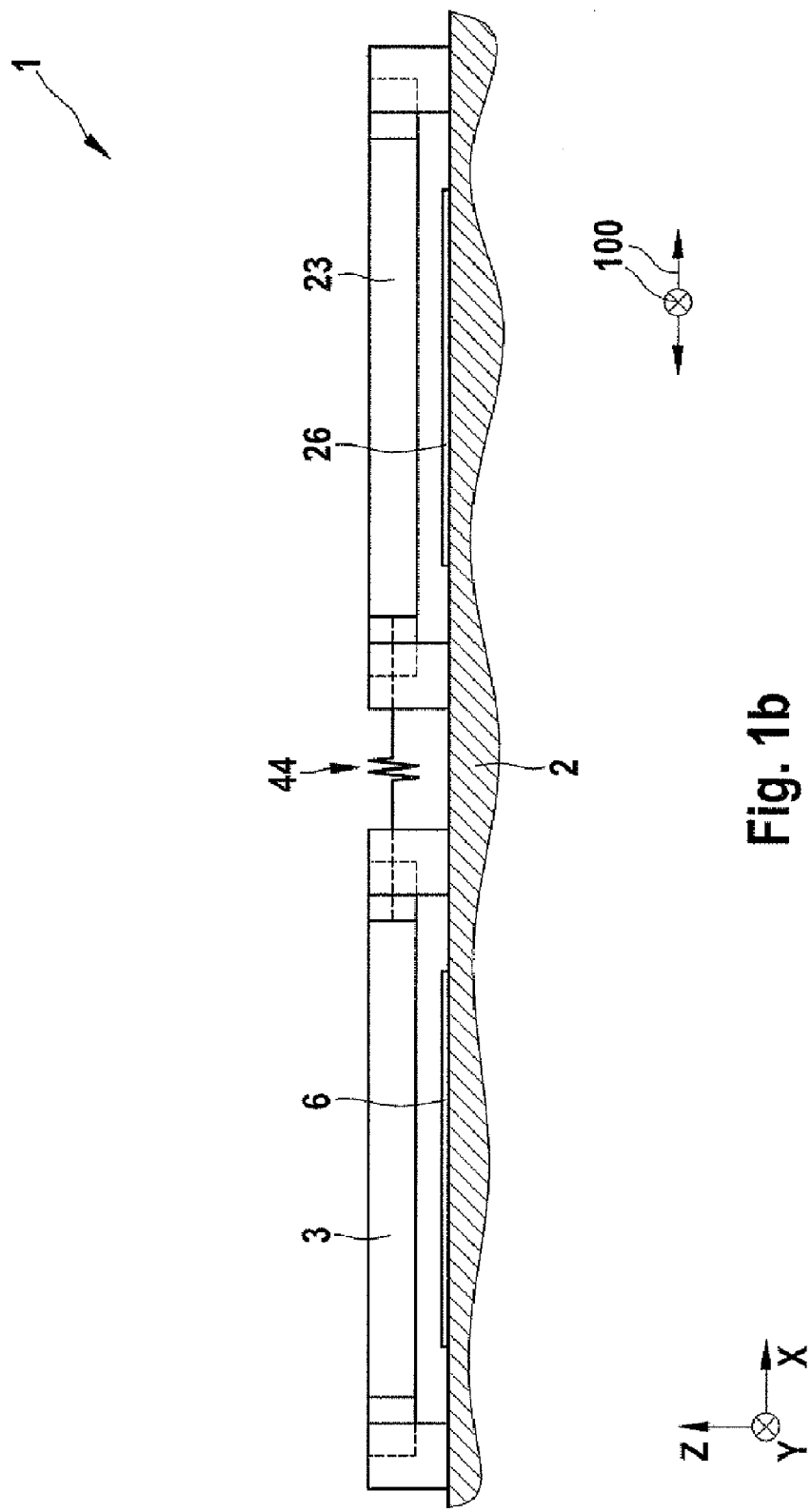

FIGS. 1*a* and 1*b* depict a schematic plan view and, below the schematic plan view, a schematic side view, of a rotation rate sensor 1 according to the existing art, rotation rate sensor 1 having: a substrate 2 having a main extension plane 100; a first Coriolis element 3; and a second Coriolis element 23, second Coriolis element 23 being disposed parallel to main extension plane 100 next to first Coriolis element 3. First Coriolis element 3 is excited, by way of a first excitation means 4, to execute a first oscillation 5 parallel to a first axis X in main extension plane 100, while a second excitation means 24 excites second Coriolis element 23 to execute a second oscillation 25 parallel to first axis X. First and second oscillations 5, 25 oscillate in opposite phase from one another, i.e. they move antiparallel to one another. A first Coriolis deflection of first Coriolis element 3 in a second axis Z substantially perpendicular to main extension plane 100, as a result of a first Coriolis force acting on first Coriolis element 3, is detected by means of first detection means 6, while a second Coriolis deflection of second Coriolis element 23 in a second axis Z substantially perpendicular to main extension plane 100, as a result of a Coriolis force acting on second Coriolis element 3, is detected by way of second detection means 26. The Coriolis force on the first and/or second Coriolis element 3, 23 acts in the event of a rotation rate of rotation rate sensor 1, which rate extends substantially parallel to a third axis Y that is disposed in main extension plane 100 and perpendicular to first and to second axis X,Z. As a result of the antiparallel oscillation 5, 25 of first and of second Coriolis element 3, 23, the Coriolis forces with respect to second axis Z bring about a mutually antiparallel first and second Coriolis deflection. The difference between a first detected signal of first detection means 6 and a second detected signal of second detection means 26 is dependent in particular on the Coriolis forces and is thus also dependent on the rotation rate.

Because the Coriolis forces are likewise dependent on the velocities of first and of second Coriolis element 3, 23 in first and second oscillation 5, 25, first oscillation 5 is measured by way of a first detection element 40, and second oscillation 25 by way of a second detection element 42. First and second Coriolis element 3, 23 are connected to one another via coupling elements 44, and are respectively connected to substrate 2 via further coupling elements 45. Coupling elements 44, 45 preferably encompass spring elements. First and second excitation means 4, 24, as well as first and second detection elements 40, 42, encompass comb electrodes and are based, like first and second detection means 6, 26, in particular on an electrostatic mode of operation. Excitation of first Coriolis element 3 by first excitation means 4 brings about not only an applied force on first Coriolis element 3 parallel to first axis X, but also an applied force on first Coriolis element 3 parallel to second axis Z, so that first Coriolis element 3 is raised with respect to substrate 2. This applied force parallel to second axis Z is referred to as levitation force 502, and results from the asymmetry of the electrode disposition of first excitation means 4, since substrate 2 is located slightly below first Coriolis element 3. This motion of first Coriolis element 3 parallel to second axis Z is called "levitation deflection" and is superimposed on the Coriolis deflection, so that first detection means 6 also detects the levitation deflection. Analogously to first Coriolis element, second Coriolis element 23 likewise experiences a Coriolis force as a result of second excitation means 24.

Figure 2:
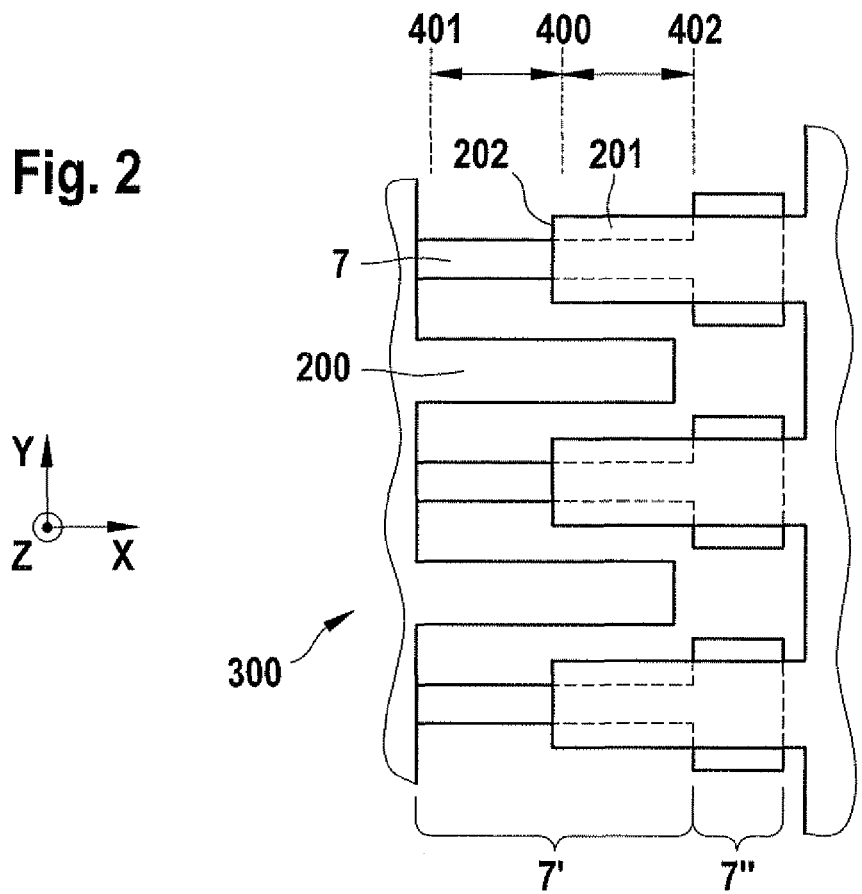
FIG. 2 shows a portion of a schematic plan view of a rotation rate sensor according to a first embodiment of the present invention.

FIG. 2 depicts a portion 300 of a schematic view of a rotation rate sensor 1 in accordance with a first embodiment of the present invention, portion 300 corresponding to the oval partial plan view 300 depicted in FIGS. 1*a* and 1*b* in the region of excitation means 4. Excitation means 4 encompass drive electrodes 200 connected to substrate 2, and counterelectrodes 201 connected to first Coriolis element 3, drive electrodes 200 and counterelectrodes 201 being embodied as mutually engaging comb structures. First Coriolis element 3 is excited to oscillate by electrostatic forces between drive electrodes 200 and counterelectrodes 201; in the context of the oscillation, first Coriolis element 3 performs a periodic oscillation deflection out of a rest position 400 relative to substrate 2 and substantially in a longitudinal direction of the electrodes, i.e. parallel to first axis X. In rest position 400, counterelectrodes 201 are substantially immersed sufficiently deeply into drive electrodes 200 that a top side 202 of counterelectrodes 201 parallel to first axis X is disposed approximately at the height of the center of drive electrodes 200, whereas upon a first maximum oscillation deflection 401, counterelectrodes 201 almost completely overlap drive electrodes 200 parallel to second axis Z, and upon a second maximum oscillation deflection 402, counterelectrodes 201 only just fail to overlap drive electrodes 200 parallel to second axis Z. First Coriolis element 3 is driven to oscillate between the first and the second maximum oscillation deflection 401, 402.

In a direction perpendicular to main extension plane 100 and parallel to third axis Y, compensation electrodes 7, in particular in the form of further comb structures, are disposed between counterelectrodes 201 and substrate 2; provision is made for generation of an electrostatic compensating force 503 between compensation electrodes 7 and counterelectrodes 201 for at least partial compensation for levitation force 502. Compensation electrodes 7 encompass a first part 7' and a second part 7". Both in first maximum oscillation deflection 401 and in second oscillation deflection 402, second part 7" is respectively disposed completely beneath counterelectrodes 201 and thus in overlapping fashion with respect to counterelectrodes 201, whereas the respective overlap between first part 7' and the corresponding counterelectrode 201 is dependent on the oscillation deflection of first Coriolis element 3.

In first maximum oscillation deflection 401, levitation force 502 is comparatively large because of the maximum coverage of drive electrodes 200 and counterelectrodes 201 parallel to third axis Y, a similarly comparatively large compensation force 503 being generated as a result of an almost complete coverage of first parts 7' with counterelectrodes 201 parallel to third axis Y. On the other hand, in second maximum oscillation deflection 402, levitation force 502 is comparatively small because of the lack of overlap between drive electrodes 200 and counterelectrodes 201, compensation force 503 being comparatively small because of the similar absence of overlap between first parts 7' and counterelectrodes 201. Compensation electrodes 7 are connected, in particular, in electrically conductive fashion to drive electrodes 200, compensation force 503 preferably being set as desired by way of the width of first parts 7' parallel to second axis Z, the width preferably encompassing substantially one-tenth of the width of counterelectrode 201. In the event that, in order to prevent overcompensation for levitation force 502, first parts 7' need to be made so narrow that they are no longer producible using standard lithographic manufacturing processes, it is alternatively conceivable to implement wider first parts 7' that, however, are disposed not under all counterelectrodes 201 but only under a few counterelectrodes 201, so that levitation force 502 is compensated for in the desired fashion, on average, over all counterelectrodes 201. The constant overlap between second part 7" and counterelectrode 201 generates a constant compensation force 503 to compensate for a constant offset.

Figure 3:
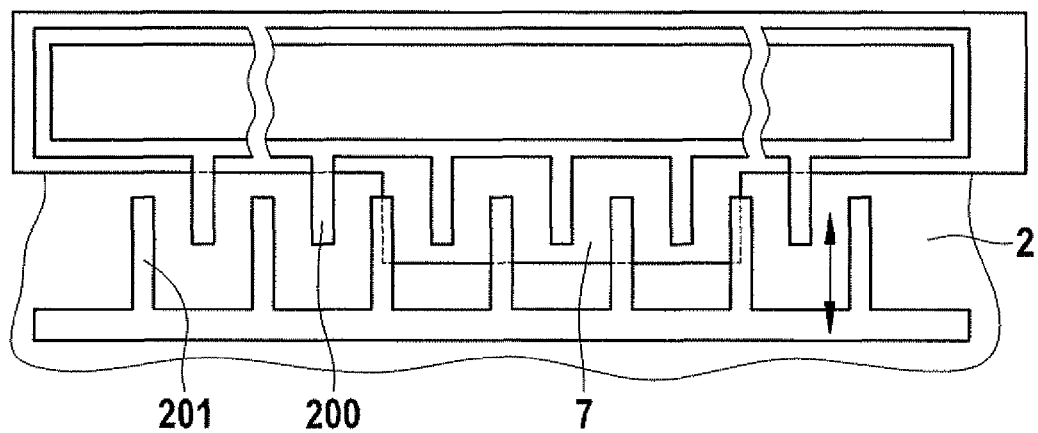
FIG. 3 shows a portion of a schematic plan view of a rotation rate sensor according to a second embodiment of the present invention.

FIG. 3 depicts a portion of a schematic plan view of a rotation rate sensor 1 in accordance with a second embodiment of the present invention, the second embodiment being substantially identical to the first embodiment, rotation rate sensor 1 having only a single compensation electrode 7 that is provided for simultaneous coverage of four counterelectrodes 201. Levitation force 502 pointing away from substrate 2 is a leakage field effect that, with immersion of the comb during drive, increases substantially more weakly than the attractive force, pointing toward substrate 2, of compensation electrodes 7 (plate capacitor). This is the case for the usual technology-based aspect ratios. Complete underlining of all counterelectrodes 201 with compensation electrodes 7 would therefore (given the usual technology-based aspect ratios) overcompensate for levitation force 402. The ratio of the increase in levitation force 502 with the amplitude of the oscillation deflection to the increase in compensation force 503 with the amplitude of the oscillation deflection determines the number of counterelectrodes 201 that need to be underlined with compensation electrodes 7. By defining a suitable ratio of compensated to noncompensated counterelectrodes 201, it is possible to prevent a variation in levitation force 502 with oscillation deflection.

Figure 4:
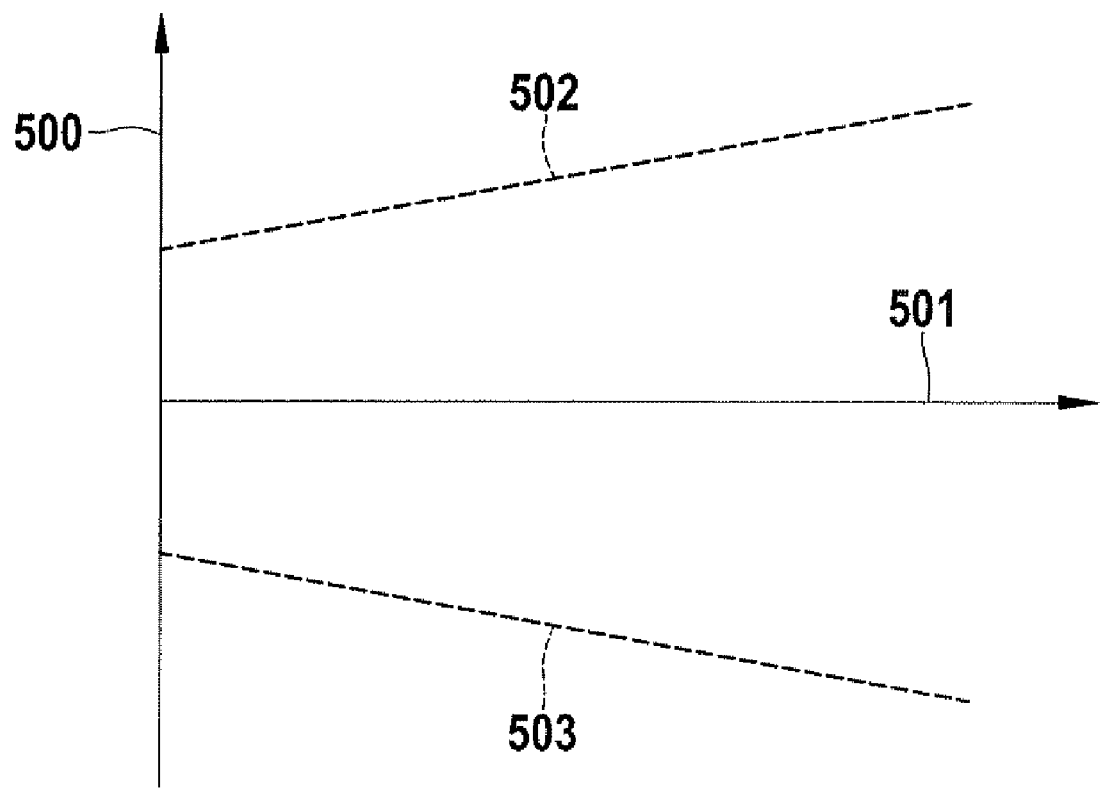
FIG. 4 shows a graph for schematic depiction of a levitation force and a compensation force as a function of an oscillation deflection of a rotation rate sensor according to the first embodiment of the present invention.

FIG. 4 is a graph to schematically depict levitation force 502 and compensation force 503 as a function of the oscillation deflection of a rotation rate sensor 1 in accordance with the first embodiment of the present invention, force being plotted on ordinate 500 and the amplitude of the oscillation deflection on abscissa 501. The graph shows on the one hand levitation force 502 which rises with increasing oscillation deflection, and on the other hand compensation force 503 that, in terms of magnitude, rises in the same manner as levitation force 502, likewise with increasing oscillation deflection; compensation force 503 behaves inversely with respect to levitation force 502, and the sum of levitation force 502 and compensation force 503 is substantially equal to zero regardless of the oscillation deflection. In particular, the Y-axis portion of compensation force 503 is adjustable by way of the size of second part 7", and the slope of compensation force 503 is adjustable by way of the width of first part 7".

What is claimed is:
1. A rotation rate sensor comprising:
a substrate having a main extension plane;
at least one drive electrode coupled to the substrate;
at least one counterelectrode;
a Coriolis element movable relative to the substrate, the Coriolis element being excitable, by way of the at least one counterelectrode coupled to the Coriolis element and the at least one drive electrode coupled to the substrate, to perform an oscillation deflection parallel to the main extension plane, the Coriolis element being deflectable, by way of a Coriolis force acting on the Coriolis element, to perform a detectable Coriolis deflection perpendicular to the main extension plane; and
at least one compensation electrode positioned above the substrate and beneath at least one of the at least one counterelectrode in an overlapping fashion for at least partial compensation, as a function of the oscillation deflection, for a levitation force acting on the Coriolis element.
2. The rotation rate sensor according to claim 1, wherein the compensation electrode is situated perpendicular to the main extension plane between the substrate and the counterelectrode.
3. The rotation rate sensor according to claim 2, wherein the compensation electrode is embodied in such a way that a coverage of the compensation electrode by the counterelectrode as a function of the oscillation deflection is provided.

4. The rotation rate sensor according to claim 2, wherein the compensation electrode is connected in electrically conductive fashion to the drive electrode.

5. The rotation rate sensor according to claim 2, wherein the compensation electrode encompasses a first part and a second part, a coverage between the first part and the counterelectrode being provided in a manner dependent on the oscillation deflection, and a further coverage between the second part and the counterelectrode being provided independently of the oscillation deflection.

6. The rotation rate sensor according to claim 2, further comprising a plurality of drive electrodes and a plurality of counterelectrodes embodied as mutually interengaging comb structures.

7. The rotation rate sensor according to claim 6, wherein a coverage is provided between the compensation electrode and the plurality of counterelectrodes.

8. The rotation rate sensor according to claim 6, wherein the at least one compensation electrode includes a plurality of compensation electrodes embodied as comb electrodes and, at least in part, situated in a region of the plurality of counterelectrodes.

9. The rotation rate sensor according to claim 8, wherein a width of the comb electrodes is a function of a desired compensation force.

10. A method for operating a rotation rate sensor including a substrate having a main extension plane, at least one drive electrode coupled to the substrate, at least one counterelectrode, and a Coriolis element movable relative to the substrate, the Coriolis element being excitable, by way of the at least one counterelectrode coupled to the Coriolis element and the at least one drive electrode coupled to the substrate, to perform an oscillation deflection parallel to the main extension plane, the Coriolis element being deflectable, by way of a Coriolis force acting on the Coriolis element, to perform a detectable Coriolis deflection perpendicular to the main extension plane, the method comprising:

compensating for, at least in part, a levitation force acting on the Coriolis element as a function of the oscillation deflection, by way of at least one compensation electrode positioned above the substrate and beneath at least one of the at least one counterelectrode in an overlapping fashion.

11. The rotation rate sensor of claim 1, wherein the at least one compensation electrode is coupled to the at least one drive electrode in such a way that the at least one compensation electrode is activated in phase with the at least one drive electrode.

* * * * *